(12) United States Patent
Kim et al.

(10) Patent No.: US 10,538,130 B2
(45) Date of Patent: Jan. 21, 2020

(54) NON-PNEUMATIC TIRE

(71) Applicants: Kumho Tire Co., Inc., Gwangju (KR); The Yokohama Rubber Company, Ltd., Tokyo (JP)

(72) Inventors: Kee-Woon Kim, Gwangju (KR); Chul-Woo Kwark, Gwangju (KR); Chang-Jung Park, Gwangju (KR); Gwi-Sung Shin, Gwangju (KR); Soon-Wook Hwang, Gwangju (KR); Michio Shimizu, Tokyo (JP); Jun Matsuda, Tokyo (JP)

(73) Assignees: KUMHO TIRE CO., INC., Gwangju (KR); THE YOKOHAMA RUBBER COMPANY, LTD., Tokyo (JP)

( * ) Notice: Subject to any disclaimer, the term of this patent is extended or adjusted under 35 U.S.C. 154(b) by 150 days.

(21) Appl. No.: 15/643,804

(22) Filed: Jul. 7, 2017

(65) Prior Publication Data
US 2018/0029419 A1  Feb. 1, 2018

(30) Foreign Application Priority Data
Jul. 29, 2016 (KR) .......... 10-2016-0097414

(51) Int. Cl.
*B60C 7/12* (2006.01)
*B60C 7/00* (2006.01)

(52) U.S. Cl.
CPC .......... *B60C 7/12* (2013.01); *B60C 2007/005* (2013.01)

(58) Field of Classification Search
CPC ........ B60C 7/12; B60C 7/14; B60C 2007/005

USPC .......................................................... 152/325
See application file for complete search history.

(56) References Cited

U.S. PATENT DOCUMENTS

| | | | | |
|---|---|---|---|---|
| 1,635,194 A | * | 7/1927 | Shively | ..................... B60C 7/12 |
| | | | | 152/325 |
| 8,104,524 B2 | * | 1/2012 | Manesh | ..................... B60B 9/00 |
| | | | | 152/301 |
| 2010/0200131 A1 | * | 8/2010 | Iwase | ..................... B29D 30/00 |
| | | | | 152/209.1 |
| 2012/0234445 A1 | | 9/2012 | Manesh et al. | |
| 2013/0240272 A1 | * | 9/2013 | Gass | ..................... B60B 9/00 |
| | | | | 180/54.1 |
| 2015/0258853 A1 | | 9/2015 | Fudemoto et al. | |

FOREIGN PATENT DOCUMENTS

| | | |
|---|---|---|
| CN | 103129308 A | 6/2013 |
| CN | 203344626 U | 12/2013 |
| CN | 103707712 A | 4/2014 |
| JP | 2010522666 A | 7/2010 |
| JP | 2014100932 A | 11/2012 |
| JP | 2015151006 A | 2/2014 |
| JP | 2014125081 A | 7/2014 |

(Continued)

*Primary Examiner* — S. Joseph Morano
*Assistant Examiner* — Jean W Charleston
(74) *Attorney, Agent, or Firm* — Saliwanchik, Lloyd & Eisenschenk

(57) ABSTRACT

A non-pneumatic tire includes a band part, including an inner band and an outer band that is separated from the inner band and surrounds an outer peripheral surface of the inner band; and a spoke part, extending in a circumferential direction between the inner band and the outer band, having a circumferential cross section having one or more holes.

3 Claims, 12 Drawing Sheets

(56) References Cited

FOREIGN PATENT DOCUMENTS

| KR | 20110018527 | 8/2009 |
|----|-------------|--------|
| KR | 20120063616 A | 6/2012 |
| WO | 2015020544 A1 | 2/2015 |
| WO | 2016105933 A1 | 6/2016 |

\* cited by examiner

NON-PNEUMATIC TIRE

CROSS-REFERENCE TO RELATED APPLICATIONS

This application is based on and claims priority from Korean Patent Application No. 10-2016-0097414, filed on Jul. 29, 2016, the disclosure of which is incorporated herein in its entirety by reference.

FIELD OF THE INVENTION

The disclosure relates to a non-pneumatic tire.

BACKGROUND OF THE INVENTION

A tire attached to a wheel of various vehicles such as a compact vehicle, a heavy equipment vehicle and the like has a function of supporting a vehicle load, a function of transmitting power of a vehicle to a ground, and a function of reducing vibration and shock from the ground during driving of the vehicle.

A conventional pneumatic tire has an excellent cushioning effect against collision and bending/stretching due to its air pressure. However, when the tire is pricked or damaged by an external object, the air pressure is not maintained, which makes it difficult to realize the function of the tire. Further, when the tire is damaged during driving, handling and breaking performance of the vehicle deteriorate and this may cause safety problems.

To that end, a non-pneumatic tire that does not require air filling was developed. In the non-pneumatic tire, a spoke is provided between a tread and a wheel in order to realize the function of the air pressure in the conventional pneumatic tire.

The non-pneumatic tire is generally used for low-speed vehicles or special purpose vehicles, and the cushioning effect, the driving performance and the like thereof are determined by a structure and a shape of the spoke.

A non-pneumatic tire 2 has a spoke 20 extending in an axial direction as shown in FIG. 12. In the case of using such a spoke, a load supporting performance and a cushioning performance deteriorate in various vehicle environments. In addition, the spoke extending in an axial direction is disadvantageous in that vibration is intense during high-speed driving.

SUMMARY OF THE INVENTION

In view of the above, the disclosure provides a non-pneumatic tire capable of improving the performance of supporting a load of a vehicle and the cushioning effect against vibration and shock from the ground. Further, the disclosure provides a non-pneumatic tire capable of reducing vibration during high-speed driving.

The non-pneumatic tire according to the embodiment can improve the load supporting performance and the cushioning effect.

The non-pneumatic tire according to the embodiment can have a uniform contact surface and ensure uniform stress distribution.

The non-pneumatic tire according to the embodiment can prevent foreign objects from being embedded in hole.

The non-pneumatic tire according to the embodiment can reduce vibration and noise.

The non-pneumatic tire according to the embodiment can improve hardness in a vertical direction.

According to an embodiment of the present invention, a non-pneumatic tire includes a band part, including an inner band and an outer band that is separated from the inner band and surrounds an outer peripheral surface of the inner band; and a spoke part, extending in a circumferential direction between the inner band and the outer band, having a circumferential cross section having one or more holes.

Further, the spoke part includes: a first spoke having a first inner supporting portion for supporting the spoke part at the inner band side, a first outer supporting portion for supporting the spoke part at the outer band side, a first central supporting portion for connecting the first inner supporting portion and the first outer supporting portion, a first inner extended portion extending in an axial direction, and a first outer extended portion extending in the axial direction at an outer side of the first inner extended portion; and a second spoke having a second inner supporting portion for supporting the spoke part at the inner band side, a second outer supporting portion for supporting the spoke part at the outer band side, a second central supporting portion for connecting the second inner supporting portion and the second outer supporting portion, a second inner extended portion extending in the axial direction, and a second outer extended portion extending in the axial direction at an outer side of the second inner extended portion. The cross sectional shapes of the holes are formed by the first spoke and the second spoke.

Further, the first outer supporting portion and the second outer portion are connected to each other at the outer band side and separated from each other at an inner side connected portion. The first inner supporting portion and the second inner supporting portion are connected to each other at the inner band side and separated from each other at an outer side of connected portion. The first inner extended portion and the second inner extended portion are connected to each other. The first outer extended portion and the second outer extended portion are connected to each other.

Further, the first central supporting portion is provided between a second central supporting portion disposed at one side of the axial direction and a second central supporting portion disposed at the other side of the axial direction. The first central supporting portion is separated from any one of the second central supporting portion disposed at one side of the axial direction and the second central supporting portion disposed at the other side of the axial direction so that the hole is formed. The first central supporting portion is connected to the other one of the second central supporting portion disposed at one side of the axial direction and the second central supporting portion disposed at the other side of the axial direction.

Further, at least one of the holes has a polygonal shape with corners.

Further, the holes form a plurality of hole layers. The hole layers include: an inner hole layer of the inner band side; an outer hole layer of the outer band side; and an intermediate hole layer provided between the inner hole layer and the outer hole layer. Holes of the inner hole layer are relatively smaller than holes of the intermediate hole layer.

Further, holes of the outer hole layer are relatively smaller than the holes of the intermediate hole layer.

Further, the inner hole layer and the outer hole layer correspond to each other.

Further, a part of the holes of the inner hole layer, the holes of the intermediate hole layer, and a part of the holes of the outer hole layer are arranged side by side along a radial direction.

Further, the inner hole layer and the outer hole layer are symmetrical with respect to the intermediate hole layer.

Further, the holes of the outer hole layer, the holes of the inner hole layer, and the holes of intermediate hole layer have a polygonal shape with a plurality of sides. The outer hole layer is provided at an outer side of the intermediate hole layer, and the inner hole layer is provided at an inner side of the intermediate hole layer. The holes of the outer hole layer, the holes of the inner hole layer, and the holes of the intermediate hole layer are arranged such that sides of the holes of the intermediate hole layer and sides of the holes of the inner hole layer face each other. The holes of the outer hole layer, the holes of the inner hole layer, and the holes of the intermediate hole layer are arranged such that sides of the holes of the intermediate hole layer and sides of the holes of the outer hole layer face each other.

Further, the spoke part includes: a first spoke, extending in a zigzag shape along the radial direction, forming a corner; and a second spoke, extending in a zigzag shape along the radial direction to correspond to the first spoke; forming a corner. The first spoke has a first extended portion extending from the corner of the first spoke along the axial direction. The second spoke has a second extended portion extending from the corner of the second spoke along the axial direction and connected to the first extended portion. The holes in the cross sectional shape are formed by the first spoke, the second spoke, and the first and second extended portion.

Further, the first spoke and the second spoke are symmetrical with respect to an axis extending along the axial direction.

Further, the first spoke has a first tilted portion inclined toward one side of the axial direction and a second tilted portion inclined to the other side of the axial direction. The first tilted portion and the second tilted portion are arranged alternately along the radial direction.

Further, the corner directed to the axial direction is formed at a portion where the first tilted portion and the second tilted portion are connected.

Further, the first spoke is provided at one end portion of the axial direction. The first extended portion extends from the corner of the first spoke toward one side of the axial direction. The second spoke is provided at the other end portion of the axial direction. The second extended portion extends from the corner of the second spoke toward the other side of the axial direction.

Further, at least a part of the holes has a hexagonal shape with vertices directed toward the axial direction.

Further, the holes include hexagonal holes and semi-hexagonal holes. The hexagonal holes and the semi-hexagonal holes are alternately arranged along the axial direction at the inner band side. The hexagonal holes and the semi-hexagonal holes are alternately arranged along the axial direction at the outer band side. The arrangement of the holes at the inner band side and the arrangement of the holes at the outer band side are symmetrical with respect to an axis extending in an axial direction.

Further, the spoke part includes a first spoke and a second spoke. The first spoke has: a first inner inclined portion, directed to one side of the axial direction, extending from the inner band to a radially outer side; a first outer inclined portion, directed to one side of the axial direction, extending from the outer band to a radially inner side. The second spoke has: a second inner inclined portion, directed to the other side of the axial direction, extending from the inner band to the radially outer side; and a second outer inclined portion, directed to the other side of the axial direction, extending from the outer band to the radially inner side.

Further, an outer end portion of the first inner inclined portion and an inner end portion of the first outer inclined portion are connected to each other at a central connected portion.

Further, an outer end portion of the second inner inclined portion and an inner end portion of the second outer inclined portion are connected to each other at a central connected portion.

Further, an inner end portion of the first inner inclined portion and an inner end portion of the second inner inclined portion are curved. An outer end portion of the first outer inclined portion and an outer end portion of the second outer inclined portion are curved.

Further, an inner end portion of the first inner inclined portion and an inner end portion of the second inner inclined portion are connected in a continuous curve. An outer end portion of the first outer inclined portion and an outer end portion of the second outer inclined portion are connected in a continuous curve.

Further, the holes form a first to a third group. holes of the first group are arranged side by side at the inner band side, holes of the second group are arranged side by side at the outer band side, and holes of the third group are arranged between the holes of the first group and the holes of the second group.

Further, the spoke part includes a first spoke and a second spoke. Each of the first spoke and the second spoke includes: a first inclined portion connected to the inner band; a second inclined portion connected to the first inclined portion; a third inclined portion connected to the second inclined portion; a fourth inclined portion connected to the third inclined portion; and a semicircular portion provided between the fourth inclined portion and the outer band.

Further, an outer end portion of the first inclined portion of the first spoke is connected to an inner end portion of the second inclined portion of the second spoke. An outer end portion of the second inclined portion of the second spoke is connected to an inner end portion of the third inclined portion of the first spoke. An outer end portion of the third inclined portion of the first spoke is connected to an inner end portion of the fourth inclined portion of the second spoke. An outer end portion of the fourth inclined portion of the second spoke is connected to an inner end portion of the semicircular portion of the first spoke.

Further, an inclination of the third inclined portion is greater than an inclination of the fourth inclined portion. An inclination of the second inclined portion is greater than the inclination of the third inclined portion. An inclination of the first inclined portion is greater than the inclination of the second inclined portion.

Further, the first spoke includes a first spoke disposed at one side and a first spoke disposed at the other side. The second spoke includes a second spoke disposed at one side and a second spoke disposed at the other side. The first spokes disposed at one side and the other side and the second spokes disposed at the other side are arranged in the order of the first spoke disposed at one side, the second spoke disposed at one side, the first spoke disposed at the other side, and the second spoke disposed at the other side along the axial direction. A continuous circumference is formed by a first inclined portion of the first spoke disposed at one side, a second inclined portion of the second spoke disposed at one side, a third inclined portion of the first spoke disposed at the other side, and a fourth inclined portion of the second spoke disposed at the other side.

Further, the holes include: a first type hole formed by the first inclined portion of the first spoke, the first inclined portion of the second spoke, and the inner band; a second type hole formed by the first inclined portion of the first spoke, the first inclined portion of the second spoke, the second inclined portion of the first spoke, and the second inclined portion of the second spoke; a third type hole formed by the second inclined portion of the first spoke, the second inclined portion of the second spoke, the third inclined portion of the first spoke, and the third inclined portion of the second spoke; a fourth type hole formed by the third inclined portion of the first spoke, the third inclined portion of the second spoke, the fourth inclined portion of the first spoke, and the fourth inclined portion of the second spoke; a fifth type hole formed by the semicircular portion of the first spoke, the semicircular portion of the second spoke, the fourth inclined portion of the first spoke, and the fourth inclined portion of the second spoke; and a circular hole formed by the semicircular portion of the first spoke and the semicircular portion of the second spoke.

Further, the second type hole is provided between the first type hole and the third type hole. The fourth type hole is surrounded by the third type hole and the fifth type hole and the circular hole.

Further, the second type hole is greater than the third type hole. The third type hole is greater than the fourth type hole.

Further, the fifth type hole and the circular hole are alternately arranged at the outer band side.

Further, at least one of the first spoke and the second spoke has through holes penetrating in the axial direction.

Further, the spoke part contains at least one of Thermo Plastic Polyester Elastomer (TPEE), Thermo Plastic Polyurethane Elastomer (TPU), Thermo Plastic Olefinic Elastomer (TPO), and Thermo Plastic Polyamide Elastomer (TPAE).

Further, the spoke part has a tensile modulus ranging from 30 MPa to 200 MPa.

Further, the spoke part has a flexural modulus ranging from 40 MPa to 300 MPa.

BRIEF DESCRIPTION OF THE DRAWINGS

The objects and features of the disclosure will become apparent from the following description of embodiments, given in conjunction with the accompanying drawings, in which.

DETAILED DESCRIPTION OF THE EMBODIMENTS

Figure 1:
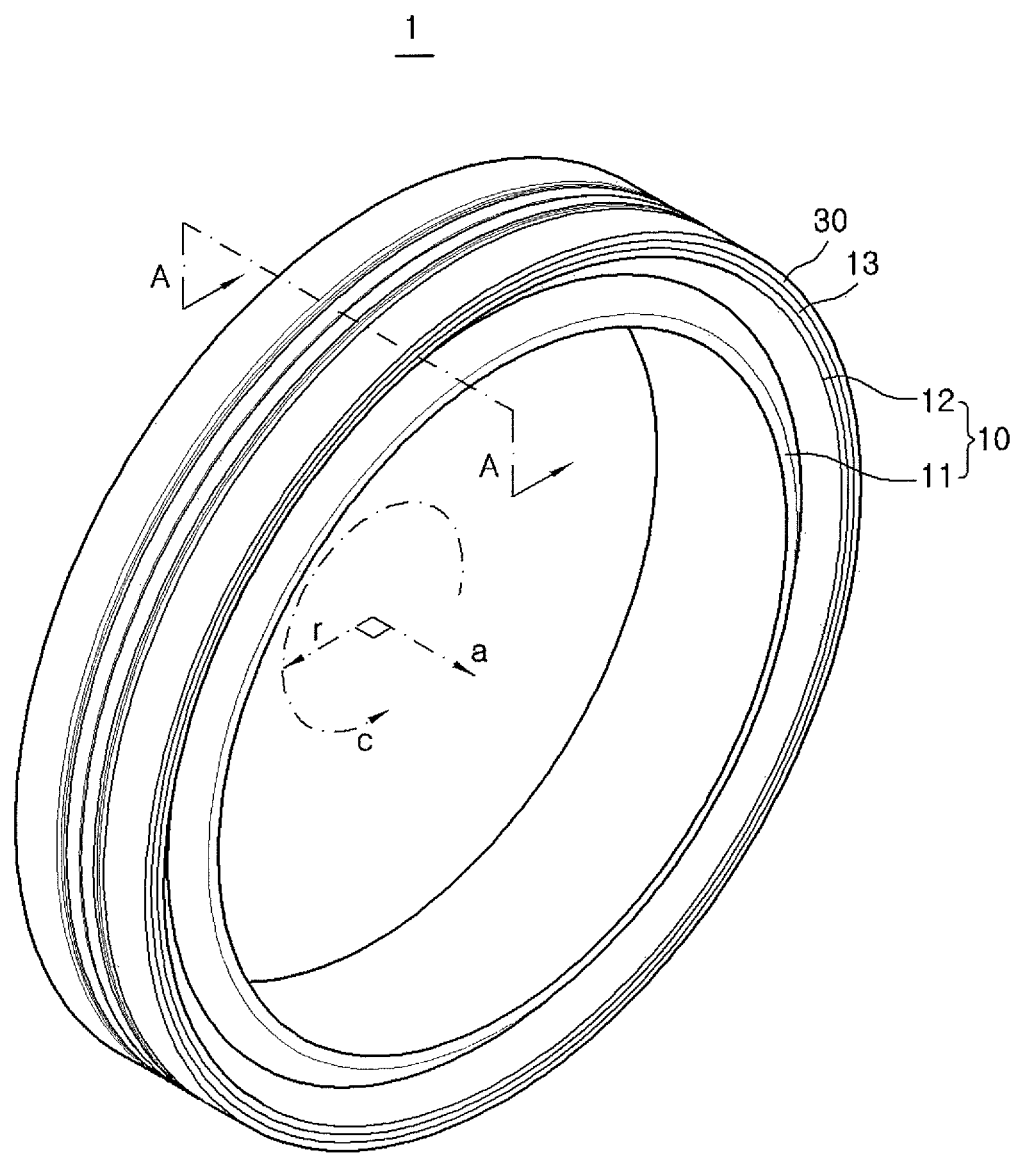
FIG. 1 is a schematic perspective view of a non-pneumatic tire according to a first embodiment.

Before the detailed description of the disclosure, it should be noted that terminologies or terms used throughout the present specification or claims should not be interpreted as general or lexical meaning, and may need to be understood as meaning and concepts corresponding to technical spirit of the disclosure based on a principle that the inventor may appropriately define the terms to descript the inventor's invention according to a best mode. Therefore, embodiments and drawings of the disclosure are only examples and thus may be represent all the technical spirit of the disclosure. Accordingly, it may be understood that the scope of the disclosure may be defined by various equivalents and modifications.

Hereinafter, embodiments will be described in detail with reference to the accompanying drawings. Like reference numerals will be used for like parts throughout the drawings. Also, in describing the disclosure, if it is determined that a detailed description of related known components or functions unnecessarily obscures the gist of the present invention, the detailed description thereof will be omitted. For the same reason, some components are exaggerated, omitted or schematically illustrated in the accompanying drawings. The size of the respective components does not entirely reflect the actual size.

In the following description, "radial direction; r" is a radial direction of a tire and "axial direction; a" is a direction orthogonal to the radial direction and parallel to a rotational axis of the tire. The axial direction does not necessarily pass through the center of the rotational axis of the tire and includes a direction parallel to the direction of the rotational axis of the tire. Further, "circumferential direction; c" is a direction along an outer peripheral surface of the tire and perpendicular to the radial direction. If not particularly mentioned, the directions include a positive direction and a negative direction.

Figure 2:
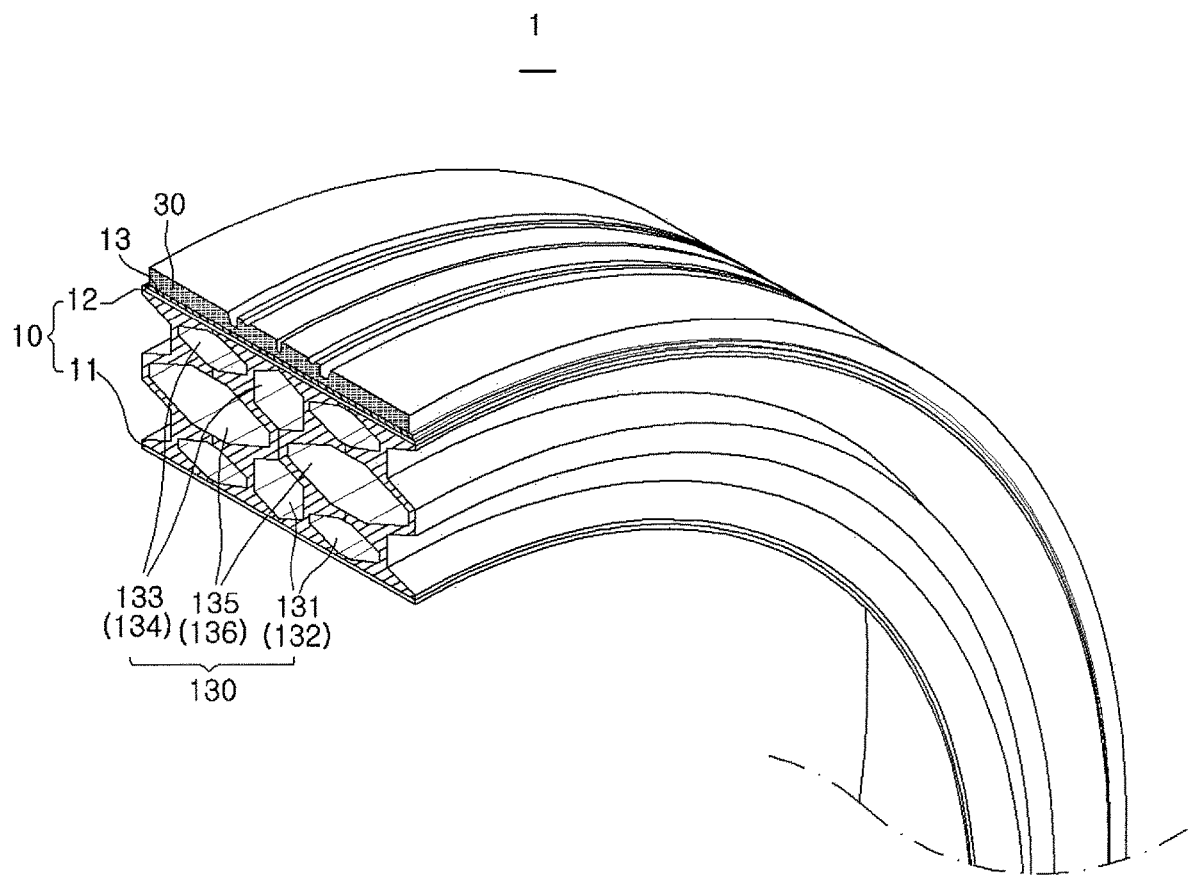
FIG. 2 is a cross sectional perspective view of a non-pneumatic tire according to the first embodiment which is taken along a line A-A' of FIG. 1.
Figure 3:
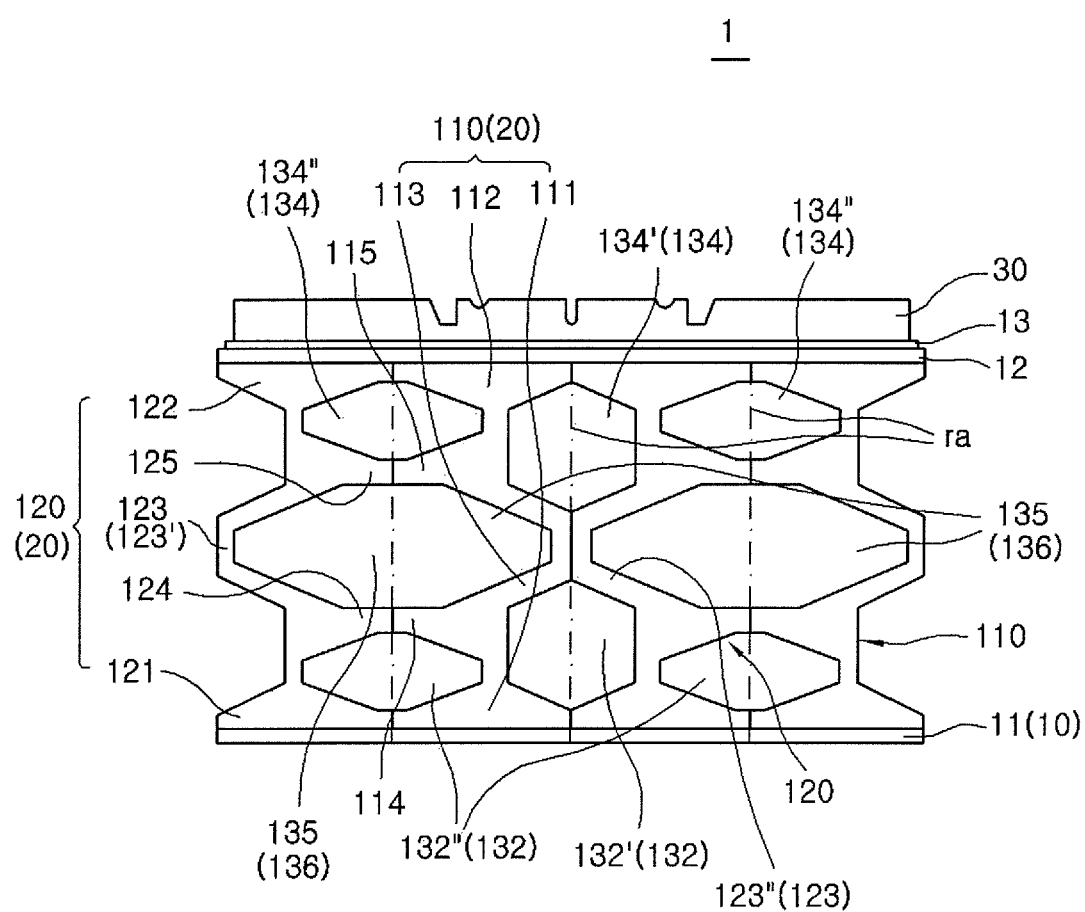
FIG. 3 is a cross sectional view of the non-pneumatic tire according to the first embodiment which is taken along the line A-A' of FIG. 1.

Hereinafter, a configuration of a non-pneumatic tire according to a first embodiment will be described with reference to FIGS. 1 to 3. FIG. 1 is a schematic perspective view of a non-pneumatic tire according to a first embodiment. FIG. 2 is a cross sectional perspective view of a non-pneumatic tire according to the first embodiment which is taken along a line A-A' of FIG. 1. FIG. 3 is a cross sectional view of the non-pneumatic tire according to the first embodiment which is taken along the line A-A' of FIG. 1;

Referring to FIGS. 1 to 3, a non-pneumatic tire 1 according to the first embodiment may include a band part 10 and a spoke part 20.

The band part 10 may have a shape corresponding to an overall outer shape of the non-pneumatic tire. The band part 10 may have, e.g., a cylindrical shape, but is not necessarily limited thereto. Further, the band part 10 may be formed as one unit with the spoke part 20 to be described later.

The band part 10 may include an inner band 11 and an outer band 12, each having a predetermined width and a strip shape with both ends in a loop. The outer band 12 is separated from the inner band 11 in a radial direction and may surround an outer peripheral surface of the inner band 11.

A rim (not shown) may be coupled to an inner peripheral surface of the inner band 11. Therefore, the shape of the inner band 11 may be variously deformed depending on the shape of the rim.

The outer band 12 is separated from the inner band 11 by a predetermined distance and may surround the inner band 11. In other words, the inner peripheral surface of the outer band 12 and the outer peripheral surface of the inner band 11 may face each other. At this time, the outer band 12 and the inner band 11 may be connected to each other by the spoke part 20 to be described later.

A shear band 13 may be provided at an outer peripheral surface of the outer band 12. The shear band 13 may be provided in a shape corresponding to the shape of the outer band 12 along a circumferential direction of the outer band 12.

The shear band 13 may primarily reduce an initial stress applied to the non-pneumatic tire 1. The shear band may be formed in one or more layers of a composite material containing carbon fiber or a composite material containing steel cord. For example, the shear band 13 may be made of CFRP (Carbon Fiber Reinforced Plastics) or formed in one or more layers of steel-cord belt used for a pneumatic tire.

A tread 30 may be provided at an outer peripheral surface of the shear band 13. The tread 30 is provided at an outermost side of the non-pneumatic tire 1 and may be in direct contact with a ground. Various structures used in this field may be employed for the tread 30.

The spoke part 20 may be provided between the inner band 11 and the outer band 12. The spoke part 20 may contain Thermo Plastic Elastomer (TPE). For example, the spoke part may contain Thermo Plastic Polyester Elastomer (TPEE), Thermo Plastic Polyurethane Elastomer (TPU), Thermo Plastic Olefinic Elastomer (TPO), Thermo Plastic Polyamide Elastomer (TPAE) or the like. The spoke part 20 may serve as a supporting structure that connects the inner band 11 and the outer band 12 and also serves as a cushioning member that distributes and absorbs shock applied to the non-pneumatic tire 1. Further, the spoke part 20 supports a load of a vehicle with the non-pneumatic tire 1. The spoke part 20 absorbs the shock and supports the load, and thus requires a mechanical configuration suitable therefor.

The spoke part 20 may have the following mechanical properties.

| Mechanical properties | Tensile Modulus (MPa) | Flexural Modulus (MPa) |
| --- | --- | --- |
| Measurement value | 30-200 | 40-300 |
| Measurement method | ASTM D638 | ASTM D790 |

The tensile modulus of the spoke part 20 may be measured by ASTM D638. The tensile modulus of the spoke part 20 may be within a range from 30 MPa to 200 MPa. When the tensile modulus of the spoke part 20 is less than 30 MPa, the load supporting power becomes weak. Accordingly, the spoke part 20 may be excessively deformed even by small impact and the deformation of the spoke part 20 may result in breakage of the spoke part 20. When the tensile modulus of the spoke part 20 exceeds 200 MPa, hardness is excessively increased. Accordingly, the bending/stretching of the spoke part 20 becomes poor and ride comfort deteriorates. In addition, a footprint of the tire is reduced, so that the breaking performance deteriorates.

The flexural modulus of the spoke part 20 may be measured by ASTM D790. The flexural modulus of the spoke part 20 may be within a range from 40 MPa to 300 MPa. When the flexural modulus of the spoke part 20 is less than 40 MPa, the load supporting power becomes weak. Accordingly, the spoke part 20 may be excessively deformed even by small impact and the deformation of the spoke part 20 may result in breakage of the spoke part 20. When the flexural modulus of the spoke part 20 exceeds 300 MPa, the bending/stretching of the spoke part 20 becomes poor and the ride comfort deteriorates.

The spoke part 20 may extend continuously in a circumferential direction between the inner band 11 and the outer band 12. In other words, the spoke part 20 may be configured to form a closed curve along the circumference of the tire. When viewed in the circumferential direction, the cross section of the spoke part 20 includes one or more holes 130, 250, 330 and 430. The holes may have a cross section of closed loop when viewed in the circumferential direction. Since the spoke part 20 extends along the circumferential direction, the holes formed in the spoke part 20 extend along the circumferential direction.

The spoke part 20 may include a first spoke 110 and a second spoke 120. The first spoke 110 and the second spoke 120 extend along the radial direction between the inner band 11 and the outer band 12. The first spoke 110 and the second spoke 120 may be symmetrical with respect to an axis ra extending in the radial direction. The first spoke 110 includes: a first inner supporting portion 111 for supporting the spoke part 20 at the inner band 11 side; a first outer supporting portion 112 for supporting the spoke part 20 at the outer band 12 side; a first central supporting portion 113 for connecting the first inner supporting portion 111 and the first outer supporting portion 112 and extending in the radial direction; a first inner extended portion 114 extending in the axial direction and connecting the first inner supporting portion and the first central supporting portion; and a first outer extended portion 115 extending in the axial direction at the outer side of the first inner extended portion 114 and connecting the first outer supporting portion and the first central supporting portion. The second spoke 120 includes: a second inner supporting portion 121 for supporting the spoke part 20 at the inner band 11 side; a second outer supporting portion 122 for supporting the spoke part 20 at the outer band 12 side; a second central supporting portion 123 for connecting the second inner supporting portion 121 and the second outer supporting portion 122; a second inner extended portion 124 extending in the axial direction and connecting the second inner supporting portion and the second central supporting portion; and a second outer extended portion 125 extending in the axial direction at the outer side of the second inner extended portion 124 and connecting the second outer supporting portion and the second central supporting portion.

The first inner supporting portion 111 and the second inner supporting portion 121 are connected to each other at the inner band 11 side and separated from each other at a radially outer side of the connected portion. The separated portion may form a hole 132 of an inner hole layer which will be described later. The first central supporting portion 113 of the first spoke 110 and the second central supporting portion 123 of the second spoke 120 may be bent along the axial direction to face each other. With this bending, the first central supporting portion 113 and the second central supporting portion 123 can be connected to each other. The first outer supporting portion 112 and the second outer supporting portion 122 are connected to each other at the outer band 12 side and separated from each other at a radially inner side of the connected portion. The separated portion may form a hole 134 of an outer hole layer which will be described later. The first inner extended portion 114 and the second inner extended portion 124 extend along the axial direction to face each other and are connected each other. The first outer extended portion 115 and the second outer extended portion 125 extend along the axial direction to face each other and are connected to each other.

One or more holes 130 may exist in the circumferential cross section of the spoke part 20 (i.e., the cross section taken along the line A-A' of FIG. 1). The holes 130 may be formed by the first spoke 110 and the second spoke 120.

The holes 130 may have one or more polygonal shapes selected among, e.g., a tetragon, a pentagon, a hexagon and an octagon of which one or more vertices are directed in the axial direction.

The holes 130 may form a plurality of groups, e.g., an inner hole layer 131, an outer hole layer 133, and an intermediate hole layer 135. The holes 132 of the inner hole layer 131 are arranged adjacent to each other in the axial direction at the inner band 11 side. The holes 134 of the outer hole layer 133 are arranged adjacent to each other in the axial direction at the outer band 12 side. The holes 136 of the intermediate hole layer 135 are arranged adjacent to each other in the axial direction between the inner hole layer 131 and the outer hole layer 133. The holes 132 of the inner hole layer may include first holes 132' of the inner hole layer and second holes 132" of the inner hole layer. The holes 134 of the outer hole layer may include first holes 134' of the outer hole layer and second holes 134" of the outer hole layer. The second holes 132" of the inner hole layer, the holes 136 of the intermediate hole layer, and the second holes 134" of the outer hole layer may be arranged side by side along a radial direction r.

The holes 130 may be formed by the separation and connection of the first spoke 110 and the second spoke 120. For example, the hole 132 of the inner hole layer may be formed at the separated portion of the first inner supporting portion 111 and the second inner supporting portion 121. In other words, the holes 132 of the inner hole layer may be formed at a radially outer side of the connected portion of the first inner supporting portion 111 and the second inner supporting portion 121. The holes 132 of the inner hole layer 131 may be arranged along the axial direction.

The first hole 132' of the inner hole layer may be formed by the connected portion of the first and the second inner supporting portion 111 and 121 and by the connected portion of the first and the second intermediate supporting portion 113 and 123. In other words, the first hole 132' of the inner hole layer is formed by a space between the connected portion of the first and the second inner supporting portion 111 and 121 and the connected portion of the first and the second intermediate supporting portion 113 and 123. The second hole 132" of the inner hole layer may be formed by the connected portion of the first and the second inner supporting portion 111 and 121 and the connected portion of the first and the second inner extended portion 114 and 124. In other words, the second hole 132" of the inner hole layer is formed by a space between the connected portion of the first and the second inner supporting portion 111 and 121 and the connected portion of the first and the second inner extended portion 114 and 124.

The first hole 132' of the inner hole layer 131 and the second hole 132" of the inner hole layer 131 may be alternately arranged. Further, the first hole 132' of the inner hole layer 131 may be longer in the radial direction than the second hole 132" of the inner hole layer 131. Moreover, the first hole 132' of the inner hole layer 131 and the second hole 132" of the inner hole layer 131 may shapes with each other. For example, the first hole 132' of the inner hole layer 131 may have a hexagonal shape, and the second hole 132" of the inner hole layer 131 may have an octagonal shape.

The first outer supporting portion 112 and the second outer supporting portion 122 are connected to each other at the outer band 12 side and separated at a radially inner side of the connected portion. The hole 134 of the outer hole layer may be formed at the separated portion of the first outer supporting portion 112 and the second outer supporting portion 122. In other words, the holes 134 of the outer hole layer may be formed at a radially inner side of the connected portion of the first and the second outer supporting portion 112 and 122. The holes 134 of the outer hole layer 133 may be arranged along the axial direction.

The first hole 134' of the outer hole layer may be formed by the connected portion of the first and the second outer supporting portion 112 and 122 and the connected portion of the first and the second intermediate supporting portion 113 and 123. In other words, the first hole 134' of the outer hole layer may be formed by the connected portion of the first and the second outer supporting portion 112 and 122 and the connected portion of the first and the second intermediate supporting portion 113 and 123. The second hole 134" of the outer hole layer may be formed by the connected portion of the first and the second outer supporting portion 112 and 122 and the connected portion of the first and the second outer extended portion 115 and 125. In other words, the second hole 134" of the outer hole layer may be formed by a space between the connected portion of the first and the second outer supporting portion 112 and 122 and the connected portion of the first and the second outer extended portion 115 and 125.

The arrangement and the shapes of the first hole 134' and the second hole 134" of the outer hole layer 133 may correspond to those of the first hole 132' and the second hole 132" of the inner hole layer. Thus, the first hole 134' and the second hole 134" of the outer hole layer 133 may be symmetric with the first hole 132' and the second hole 132" of the inner hole layer. Further, the first hole 134' and the second hole 134" of the outer hole layer may be alternately arranged. Further, the first hole 134' of the outer hole layer may be longer in the radial direction than the second hole 134" of the outer hole layer. Moreover, the first hole 134' of the outer hole layer may have a different shape from that of the second hole 134" of the outer hole layer. The holes 136 of the intermediate hole layer 135 may be formed by the separation and connection of the first and the second central supporting portion 113 and 123. For example, when the first central supporting portion 113 is positioned between two second central supporting portions 123, the first supporting portion 113 may be bent in a direction separated from the second central supporting portion 123'. Therefore, the first central supporting portion 113 may be bent toward the second central supporting portion 123". The first central supporting portion 113 is symmetrical with the second central supporting portions 123' and also symmetrical with the second central supporting portions 123". Accordingly, as in the case of the first central supporting portion 113, the second central supporting portions 123' may be bent in a direction separated from the first central supporting portion.

With this bending, the first central supporting portion 113 and the second central supporting portions 123' may form the holes 136 of the intermediate hole layer 135. The holes 136 of the intermediate hole layer 135 may be arranged between the inner hole layer 131 and the outer hole layer 133. The holes 136 of the intermediate layer hole 135 may be arranged along the axial direction.

The first and the second central supporting portion 113 and 123" are adjacent to each other at the intermediate portion and separated from each other at the inner band 11 side and the outer band 12 side. The first and the second central supporting portion 113 and 123" separated at the inner band 11 side contribute to the formation of the first hole 132' of the inner hole layer. The first and the second central supporting portion 113 and 123" separated at the outer band 12 side contribute to the formation of the first hole 134' of the outer hole layer. In other words, the first hole 132' of the inner hole layer 131 may be formed by the first and the second inner supporting portion 111 and 121 and the first and the second central supporting portion 113 and 123". The first hole 134' of the outer hole layer 133 may be formed by the first and the second outer supporting portion 112 and 122 and the first and the second central supporting portion 113 and 123". The first and the second inner extended portion 114 and 124 do not contribute to the formation of the first hole 132' of the inner hole layer 131 and the formation of the first hole 134' of the outer hole layer 133.

The hole 132 of the inner hole layer 131 may be relatively smaller than the hole 136 of the intermediate hole layer 135. The hole 134 of the outer hole layer 133 may be relatively smaller than the hole 136 of the intermediate hole layer 135. In other words, the hole 136 of the intermediate hole layer 135 may be greater than the hole 132 of the inner hole layer 131 and the hole 134 of the outer hole layer 133.

The inner hole layer 131 and the outer hole layer 133 may be symmetrical with respect to the intermediate hole layer 136. The holes 132 of the inner hole layer 131 may be arranged at the inner band 11 side of the holes 136 of the intermediate hole layer 135. The holes 134 of the outer hole layer 133 may be arranged at the outer band 12 side of the holes 136 of the intermediate hole layer 135. A part of the holes 132 of the inner hole layer 131, the hole 136 of the intermediate hole layer 135, and a part of the holes 134 of the outer hole layer 133 may be arranged side by side in a radial direction. For example, the second holes 132" of the inner hole layer, the holes 136 of the intermediate hole layer, and the second holes 134" of the outer hole layer may be arranged side by side along the radial direction.

Figure 4:
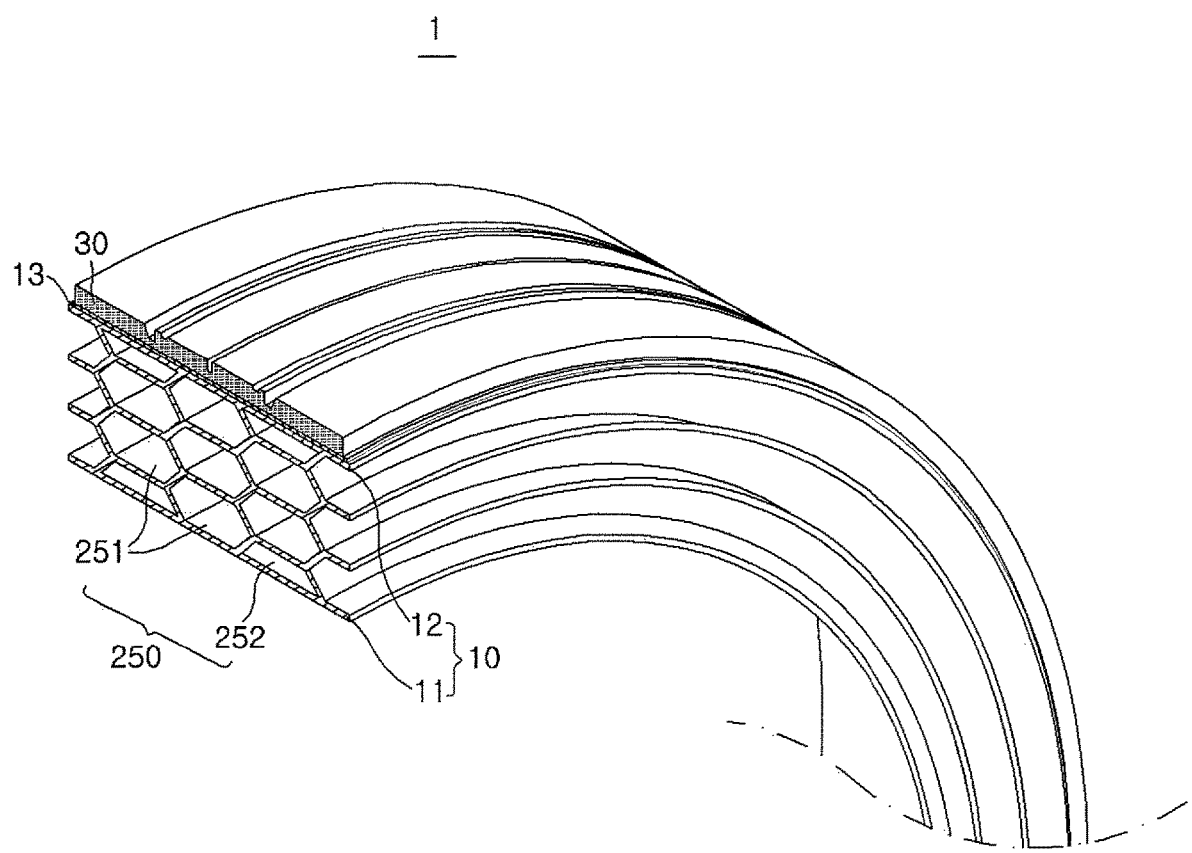
FIG. 4 is a cross sectional perspective view of a non-pneumatic tire according to a second embodiment which is taken along the line A-A' of FIG. 1.
Figure 5:
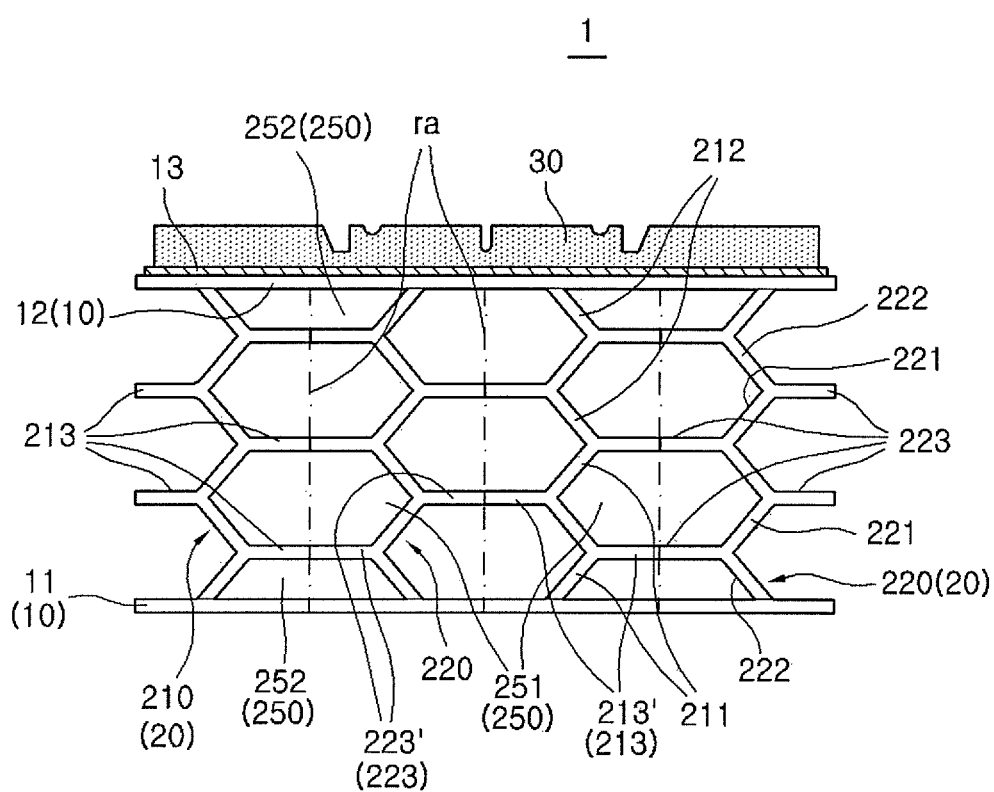
FIG. 5 is a cross sectional view of the non-pneumatic tire according to the second embodiment which is taken along the line A-A' of FIG. 1.

A second embodiment may have another circumferential cross sectional shape other than the above-described one. Hereinafter, the second embodiment will be described with reference to FIGS. 4 and 5. FIG. 4 is a cross sectional perspective view of a non-pneumatic tire according to the second embodiment which is taken along the line A-A' of FIG. 1. FIG. 5 is a cross sectional view of the non-pneumatic tire according to the second embodiment which is taken along the line A-A' of FIG. 1.

Referring to FIGS. 4 and 5, the non-pneumatic tire according to the second embodiment may include a spoke part 20 having a first spoke 210 and a second spoke 220.

The first spoke 210 may have tilted portions 211 and 212 and an extended portion 213. The second spoke 220 may include tilted portions 221 and 222 and an extended portion 223. The first spoke 210 may have a first tilted portion 211 inclined toward one side of the axial direction and a second tilted portion 212 inclined toward the other side of the axial direction. In other words, the first spoke 210 may have the first tilted portion 211 and the second tilted portion 212 inclined in different directions. The first tilted portion 211 and the second tilted portion 212 may be alternately arranged in the radial direction. The first and the second tilted portion 211 and 212 extend in the radial direction and connect the inner band 11 and the outer band 12. In other words, the first spoke 210 is connected to the inner band 11 and the outer band 12 and extends in a zigzag shape along the radial direction. A corner may be formed at a portion where the tilted portions meet.

The second spoke 220 may be symmetrical with the first spoke 210 with respect to an axis extending in the radial direction. Therefore, in the second spoke 220, the first and the second tilted portion 221 and 222 inclined in different directions may be alternately arranged. The direction in which the first and the tilted portion 221 and 222 of the second spoke 220 are arranged may be symmetrical with the direction in which the first and the second tilted portion 211 and 212 of the first spoke 210 are arranged. For example, when the first tilted portion 211 and the second tilted portion 212 of the first spoke 210 are arranged in that order in a radial direction r from the inner band 11 side, the second tilted portion 222 and the first tilted portion 211 of the second spoke 220 may be arranged in that order in the radial direction r from the inner band 11 side. The first and the second tilted portion 221 and 222 are arranged in a zigzag shape along the radial direction. A corner may be formed at a portion where the first and the second tilted portion 221 and 222 meet.

The first extended portion 213 may be formed at the corner of the first spoke 210. The second extended portion 233 may be formed at the corner of the second spoke 220. The first and the second extended portion 213 and 223 may extend in the axial direction. In other words, when viewed in the circumferential direction, the first and the second extended portion 213 and 223 may be arranged in parallel with the band part 10.

The first extended portion 213 of the first spoke 210 extends in a direction in which the corner of the first spoke 210 protrudes. In other words, the first extended portion 213 extends from a corner of the first spoke 210 which is directed to one side of the axial direction toward one side of the axial direction and also extends from a corner of the first spoke 210 which is directed to the other side of the axial direction toward the other side of the axial direction. Similar to the case of the first spoke 210, the second extended portion 223 of the second spoke 220 extends in a direction in which the corner of the second spoke 220 protrudes. Since the first spoke 210 and the second spoke 220 are symmetrical with each other, the first extended portion 213 of the first spoke 210 and the second extended portion 223 of the second spoke 220 are connected to each other. In other words, the first extended portion 213' extending toward the second spoke 220 and the second extended portion 223' extending toward the first spoke 210 are connected to each other. For example, the corner of the first spoke 210 which protrudes toward one side of the axial direction and the corner of the second spoke 220 which protrudes toward the other side of the axial direction extend and are connected to each other.

The holes 250 may be formed by the first spoke 210, the second spoke 220, and the band part 10. The holes 250 may be provided as a plurality of holes. The holes 250 disposed at the inner band 11 side and the holes 250 disposed at the outer band 12 side may have substantially same width (a length in the axial direction) and substantially same height (a length in the radial direction). The width of the holes 250 may be greater than the height of the holes 250. The holes 250 include hexagonal holes 251 and semi-hexagonal holes 252. The hexagonal holes 251 may be formed by the first spoke 210, the second spoke 220, and the extended portions 213 and 223. The hexagonal holes 251 formed at the inner band 11 side and at the outer band 12 side may be formed by the first spoke 210, the second spoke 220 and the band part 10. The semi-hexagonal holes 252 may be formed by the first spoke 210, the second spoke 220, and the band part 10. The semi-hexagonal holes 252 may be formed at the inner band 11 side and the outer band 12 side. The hexagonal hole 251 and the semi-hexagonal hole 252 may be arranged alternately. The arrangement of the holes at the inner band 11 side and the arrangement of the holes at the outer band 12 side may be symmetrical with respect to an axis extending in the axial direction between the inner band 11 and the outer band 12.

Figure 6:
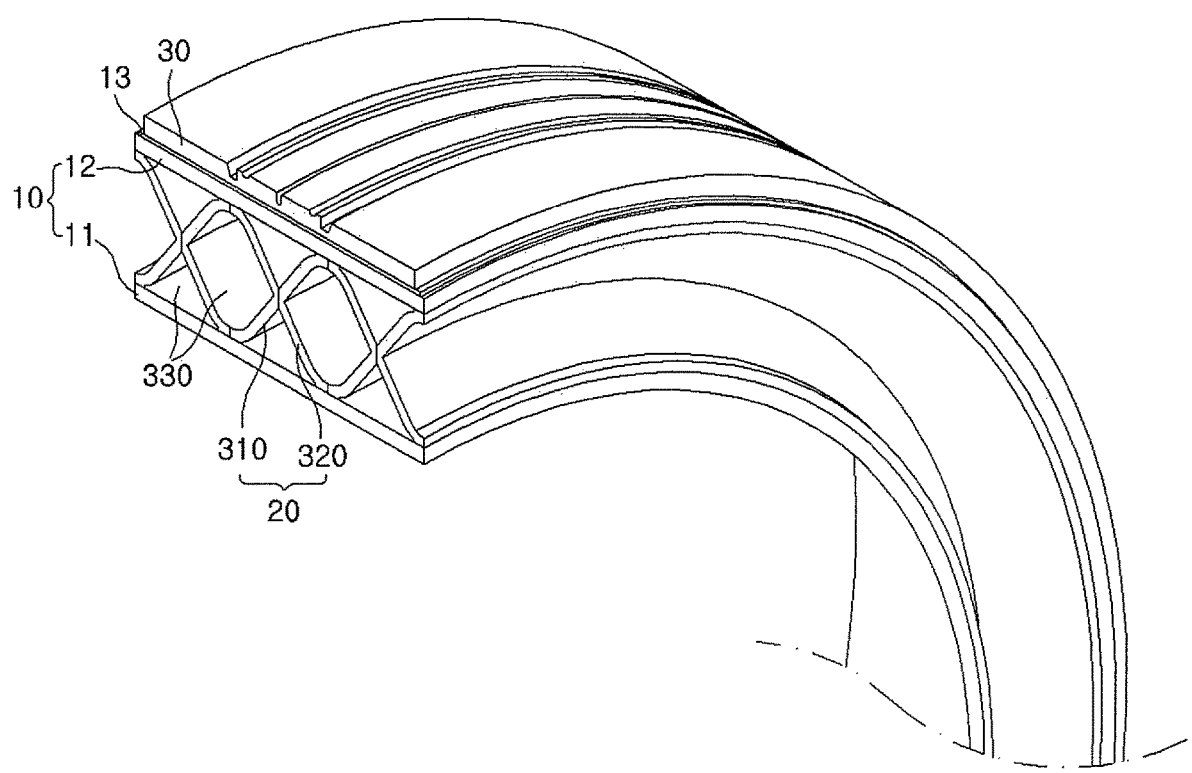
FIG. 6 is a cross sectional perspective view of a non-pneumatic tire according to a third embodiment which is taken along the line A-A' of FIG. 1.
Figure 7:
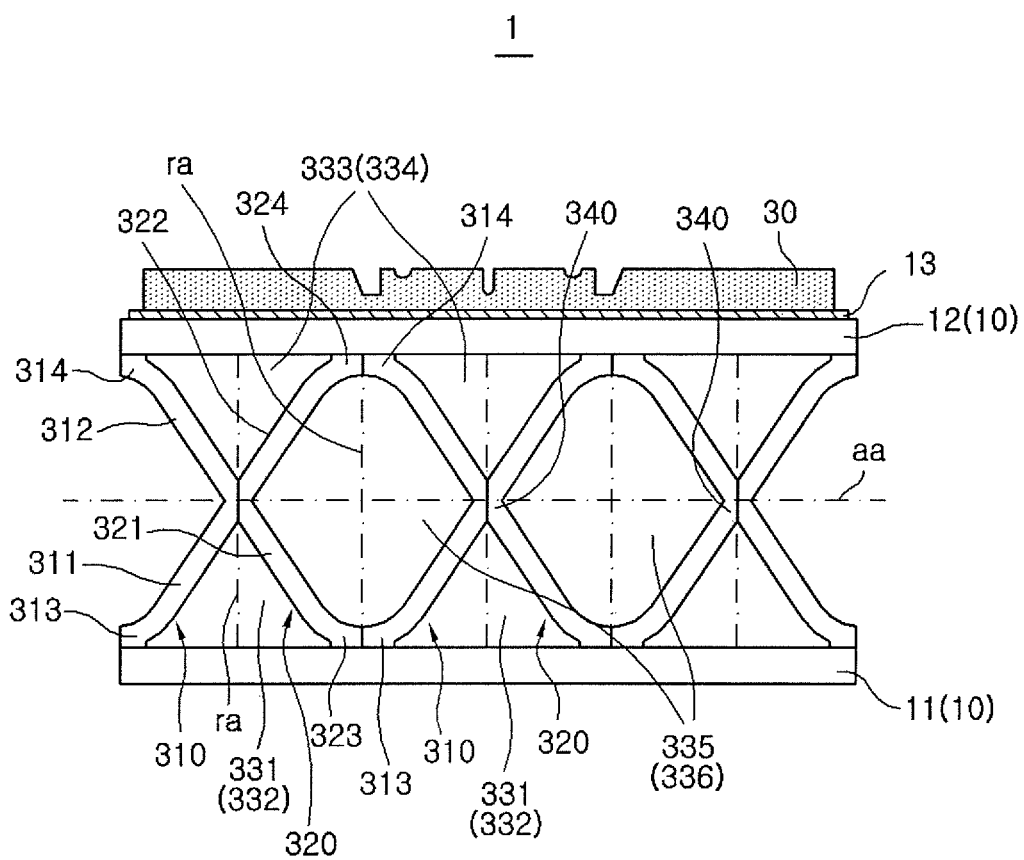
FIG. 7 is a cross sectional view of the non-pneumatic tire according to the third embodiment which is taken along the line A-A' of FIG. 1.

A third embodiment may have another circumferential cross section other than the above-described one. Hereinafter, the third embodiment will be described with reference to FIGS. 6 and 7. FIG. 6 is a cross sectional perspective view of a non-pneumatic tire according to the third embodiment which is taken along the line A-A' of FIG. 1. FIG. 7 is a cross sectional view of the non-pneumatic tire according to the third embodiment which is taken along the line A-A' of FIG. 1.

Referring to FIGS. 6 and 7, a first spoke 310 and a second spoke 320 may extend along the radial direction r between the inner band 11 and the outer band 12.

The first spoke 310 includes a first inner inclined portion 311 directed to one side of the axial direction and extending from the inner band 11 to a radially outer side, and a first outer inclined portion 312 directed to one side of the axial direction and extending from the outer band 12 to a radially inner side. The first inner inclined portion 311 and the first outer inclined portion 312 may be symmetrical with respect to an axis aa extending in the axial direction. An inner end portion 313 of the first inner inclined portion 311 may be formed in a smooth and continuous curve in contact with the inner band 11. An outer end portion 314 of the first outer inclined portion 312 may be formed in a smooth and continuous curve in contact with the outer band 12. An outer end portion of the first inner inclined portion 311 and an inner end portion of the first outer inclined portion 312 may meet and form a central connected portion 340 between the inner band 11 and the outer band 12.

The second spoke 320 may be symmetrical with the first spoke 310 with respect to an axis ra extending in the radial direction. In other words, the second spoke 320 includes a second inner inclined portion 321 directed to the other side of the axial direction and extending from the inner band 11 to the radially outer side, and a second outer inclined portion 322 directed to the other side of the axial direction and extending from the outer band 12 to the radially inner side. The second inner inclined portion 311 and the second outer inclined portion 322 may be symmetrical with respect to the axis aa extending in the axial direction. An inner end portion 323 of the second inner inclined portion 321 may be formed in a smooth and continuous curve in contact with the inner band 11. An outer end portion 324 of the second outer inclined portion 322 may be formed in a smooth and continuous curve in contact with the outer band 12. An outer end portion of the second inner inclined portion 321 and an inner end portion of the second outer inclined portion 322 may meet and form the central connected portion 340 between the inner band 11 and the outer band 12. The central connected portion 340 of the first spoke 310 and the central connected portion 340 of the second spoke 320 may be configured to correspond to each other. In other words, the central connected portion 340 of the first spoke 310 may function as the central connected portion 340 of the second spoke 320.

The first spoke 310 and the second spoke 320 may also be connected at the inner band 11 side and the outer band 12 side. In other words, the inner end portion 313 of the first spoke 310 and the inner end portion 323 of the second spoke 320 may be connected in a continuous curve. In the same manner, the outer end portion 314 of the first spoke 310 and the outer end portion 324 of the second spoke 320 may be connected in a continuous curve.

The first and the second spoke 310 and 320 may have a wave shape when viewed from the circumferential cross section. In other words, the first spoke 310 and the second spoke 320 may be configured to have a shape in which two waves extending in the axial direction are symmetrical with respect to the axis aa extending in the axial direction between the inner band 11 and the outer band 12.

The inner band 11, the outer band 12, the first spoke 310, and the second spoke 320 may form a plurality of holes 330. The holes 330 may form a plurality of groups. For example, the holes 330 may include holes 332 of a first group 331, holes 334 of a second group 333, and holes 336 of a third group 335. The holes 332 of the first group 331 may be arranged at the inner band 11 side. The holes 334 of the second group 333 may be arranged at the outer band 12 side. The holes 336 of the third group 335 may be arranged between the holes 332 of the first group 331 and the holes 334 of the second group 333.

The holes 332 of the first group 331 may be arranged side by side along the axial direction. The holes 332 of the first group 331 may have a substantially triangular shape having a corner directed toward the outer band 11. The holes 334 of the second group 333 may be arranged side by side along the axial direction. The holes 334 of the second group 333 may have a substantially triangular shape having a corner directed toward the inner band 12. The holes 336 of the third group 335 may have a substantially rhombus shape having curved corners in a radial direction.

Figure 8:
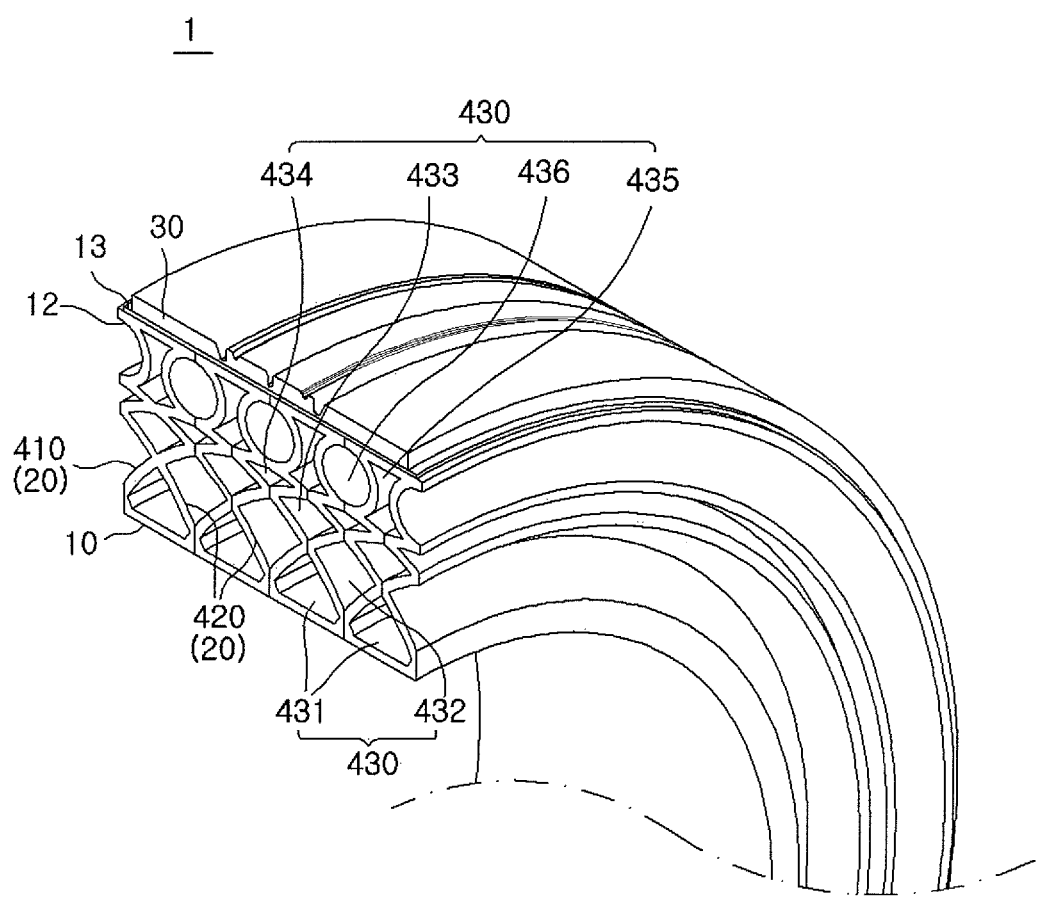
FIG. 8 is a cross sectional perspective view of a non-pneumatic tire according to a fourth embodiment which is taken along the line A-A' of FIG. 1.
Figure 9:
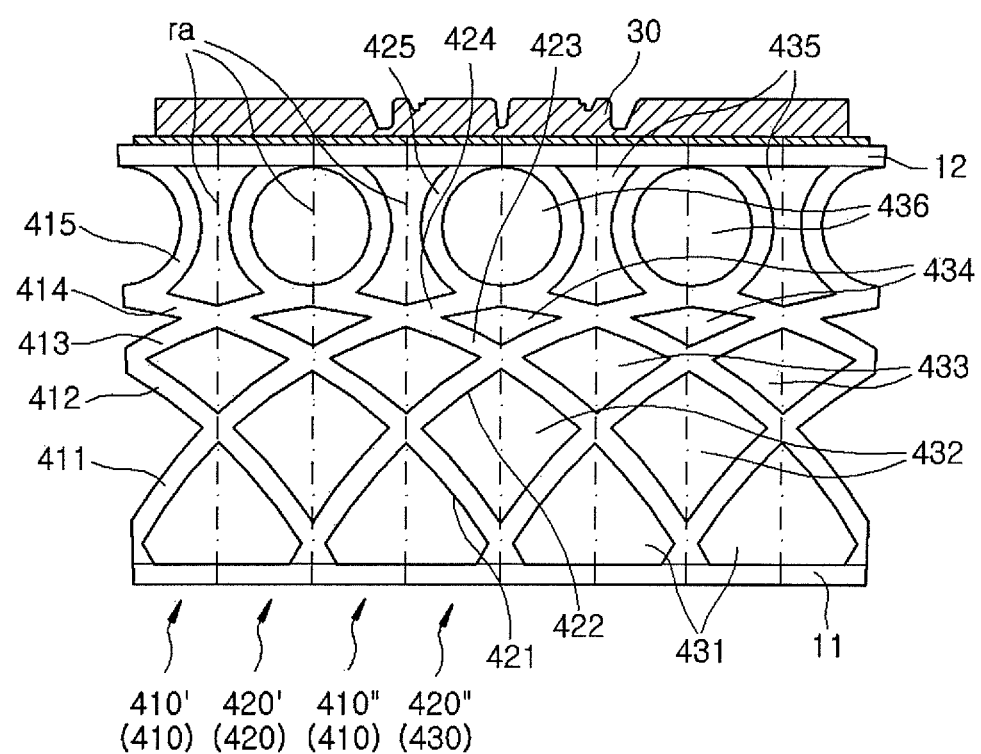
FIG. 9 is a cross sectional view of the non-pneumatic tire according to the fourth embodiment which is taken along the line A-A' of FIG. 1.

A fourth embodiment may have another circumferential cross sectional shape other than the above-described one. Hereinafter, the fourth embodiment will be described with reference to FIGS. 8 and 9. FIG. 8 is a cross sectional perspective view of a non-pneumatic tire according to the fourth embodiment which is taken along the line A-A' of FIG. 1. FIG. 9 is a cross sectional view of the non-pneumatic tire according to the fourth embodiment which is taken along the line A-A' of FIG. 1.

Referring to FIGS. 8 and 9, the non-pneumatic tire according to the fourth embodiment may include a spoke part 20 having a first spoke 410 and a second spoke 420.

The first spoke 410 may include inclined portions 411 to 414 and a semicircular portion 415. The second spoke 420 may include inclined portions 421 to 424 and a semicircular portion 425. In other words, the first spoke 410 may include the first inclined portion 411 connected to the inner band 11, inclined to one side and extending to the outer band 12, the second inclined portion 412 connected to an outer end portion of the first inclined portion 411, inclined to other side and extending to the outer band 12, the third inclined portion 413 connected to an outer end portion of the second inclined portion 412, inclined to one side and extending to the outer band 12, the fourth inclined portion 414 connected to an outer end portion of the third inclined portion 413, inclined to other side and extending to the outer band 12, and the semicircular portion 415 connected to an outer end portion of the fourth inclined portion 414 and the outer band 12 and having a convex shape toward one side. The second spoke 420 may include the first inclined portion 421 connected to the inner band 11, the second inclined portion 422 connected to the first inclined portion 421, the third inclined portion 423 connected to the second inclined portion 422, the fourth inclined portion 424 connected to the third inclined portion 423, and the semicircular portion 425 formed between the fourth inclined portion 424 and the outer band 12. The inclined portions 411, 412, 413, 414, 421, 422, 423 and 424 and the semicircular portions 415 and 425 are arranged from the inner band 11 side toward the outer band 12 side in the order of the first inclined portions 411 and 421, the second inclined portions 412 and 422, the third inclined portions 413 and 423, the fourth inclined portions 414 and 424, and the semicircular portions 415 and 425.

Each of the first to the fourth inclined portions 411, 412, 413, 414, 421, 422, 423 and 424 is connected at its end portion to another inclined portion. For example, an outer end portion of the first inclined portion 411 is connected to an inner end portion of the second inclined portion 412, and an inner end portion of the third inclined portion 413 is connected to an outer end portion of the second inclined portion 412. In other words, the first to the fourth inclined portions 411 to 414 may extend in a zigzag shape along the radial direction.

Further, the first inclined portion 411 and the third inclined portion 413 extend toward a radially outer side and are inclined toward one side of the axial direction. The second inclined portion 412 and the fourth inclined portion 414 extend toward the radially outer side and are inclined toward the other side of the axial direction. In other words, the inclined direction of the first inclined portion 411 and the third inclined portion 413 is opposite to that of the second inclined portion 412 and the fourth inclined portion 414.

The inclination of the third inclined portion 413 is greater than that of the fourth inclined portion 414. The inclination of the second inclined portion 412 is greater than that of the third inclined portion 413. The inclination of the first inclined portion 411 is greater than that of the second inclined portion 412. Here, the "inclination" is defined as an acute average angle between the inclined portion and the axis extending in the axial direction. The acute angle may be directed to one side or the other side of the axial direction. The first to the fourth inclined portion 411 to 414 have a shape protruded toward the radially outer side.

The semicircular portion 415 connects the fourth inclined portion 414 and the outer band 12 and extends in a radial direction. In other words, the inner end portion of the semicircular portion 415 is connected to the outer end portion of the fourth inclined portion 414, and the outer end portion of the semicircular portion 415 is connected to the outer band 12. The semiconductor portion 415 of the first spoke 410 protrudes toward one side of the axial direction.

The second spoke 420 may be symmetrical with the first spoke 410 with respect to the axis extending in the radial direction. In other words, the second spoke 420 may include the first inclined portion 421, the second inclined portion 422, the third inclined portion 423, the fourth inclined portion 424, and the semicircular portion 425. The inclined portions 421 to 424 and the semicircular portion 425 are arranged from the inner band 11 side toward the outer band 12 side in the order of the first inclined portion 421, the second inclined portion 422, the third inclined portion 423, the fourth inclined portion 424, and the semicircular portion 425.

Each of the first to the fourth inclined portion 421 to 424 may be connected at its end portion to another inclined portion. The first to the fourth inclined portion 421 to 424 may extend in a zigzag shape along the radial direction.

Since the second spoke 420 is symmetrical with the first spoke 410, the inclined directions of the inclined portions 421 to 424 of the second spoke 420 are opposite to those of the inclined portions 411 to 414 of the first spoke 410. In other words, the first inclined portion 421 and the third inclined portion 423 of the second spoke 420 are inclined toward the other side of the axial direction. The second 422 and the fourth inclined portion 424 are inclined toward one side of the axial direction.

The inclination of the third inclined portion 423 is greater than that of the fourth inclined portion 424. The inclination of the second inclined portion 422 is greater than that of the third inclined portion 423. The inclination of the first inclined portion 421 is greater than that of the second inclined portion 422. The first to the fourth inclined portion 421 to 424 have a shape protruded toward the radially outer side.

The semicircular portion 425 connects the fourth inclined portion 424 and the outer band 12 and extends in the radial direction. In other words, the inner end portion of the semicircular portion 425 is connected to the outer end portion of the fourth inclined portion 424. The outer end portion of the semicircular portion 425 is connected to the outer band 12. The semiconductor portion 425 of the second spoke 420 is symmetrical with the semicircular portion 415 of the first spoke 410 and thus protrudes toward the other side of the axial direction. The semicircular portion 415 of the first spoke 410 and the semicircular portion 425 of the second spoke 420 may be connected to the outer band 12. However, it is not limited thereto, and the semicircular portion 415 of the first spoke 410 and the semicircular portion 425 of the second spoke 420 which are connected to each other may be connected to the outer band 12.

There may be provided a plurality of first spokes 410 and a plurality of second spokes 420 arranged alternately. In that case, the inclined portions 411 to 414 of the first spoke 410 and the inclined portions 421 to 424 of the second spoke 420 may form a continuous circumference. For example, when a first spoke 410', a second spoke 420', a first spoke 410" and a second spoke 420" are arranged in that order along the axial direction, the first inclined portion 411 of the first spoke 410', the second inclined portion 422 of the second spoke 420', the third inclined portion 413 of the first spoke 410", and the fourth inclined portion 424 of the second spoke 420" may form a continuous and smooth circumference. The continuous and smooth circumference may provided as a plurality. A part of the plurality of a continuous and smooth circumference may be overlapped each other.

The outer end portions of the first inclined portions 411 and 421 of the first and the second spoke 410 and 420 are connected to the inner end portions of the second inclined portions 412 and 422 of the first and the second spoke 410 and 420, respectively. For example, when the first spoke 410', the second spoke 420', and the first spoke 410" are arranged in that order along the axial direction, the outer end portion of the first inclined portion 411 of the first spoke 410' is connected to the outer end portion of the first inclined portion 421 of the second spoke 420'. The connected portion of the outer end portions of the first inclined portions 411 and 421 is connected to the inner end portion of the second inclined portion 412 of the first spoke 410' and the inner end portion of the second inclined portion 422 of the second spoke 420'. The outer end portion of the third inclined portion 413 of the first spoke 410' is connected to the outer end portion of the third inclined portion 423 of the second spoke 420'. The connected portion of the outer end portions of the third inclined portions 413 and 423 is connected to the inner end portion of the fourth inclined portion 414 of the first spoke 410' and the inner end portion of the fourth inclined portion 424 of the second spoke 420'. The semicircular portion 415 of the first spoke 410' and the semicircular portion 425 of the second spoke 420' are separated from each other.

In that case, the outer end portion of the second inclined portion 422 of the second spoke 420' is connected to the outer end portion of the second inclined portion 412 of the first spoke 410". The connected portion of the outer end portions of the second inclined portions 422 and 412 is connected with the inner end portion of the third inclined portion 423 of the second spoke 420' and the inner end portion of the third inclined portion 413 of the first spoke 410". The outer end portion of the fourth inclined portion 424 of the second spoke 420' is connected to the outer end portion of the fourth inclined portion 414 of the first spoke 410". The outer end portion of the semicircular portion 425 of the second spoke 420' is connected to the outer end portion of the semicircular portion 415 of the first spoke 410". The connected portion of the outer end portions of the fourth inclined portions 424 and 414 is connected with the inner end portion of the semicircular portion 425 of the second spoke 420' and the inner end portion of the semicircular portion 415 of the first spoke 410".

The holes 430 may be formed by the separation/connection of the inclined portion of the first spoke 410 and the inclined portion of the second spoke 420 and the separation/connection of the semicircular portion 415 of the first spoke 410 and the semicircular portion 425 of the second spoke 420.

The first inclined portions 411 and 421 of the first and the second spoke 410 and 420 and the inner band 11 form a first type hole 431. The second inclined portions 412 and 422 of the first and the second spoke 410 and 420 and the first inclined portions 411 and 421 of the first and the second spoke 410 and 420 form a second type hole 432. The third inclined portions 413 and 423 of the first and the second spoke 410 and 420 and the second inclined portions 412 and 422 of the first and the second spoke 410 and 420 form a third type hole 433. The fourth inclined portions 414 and 424 of the first and the second spoke 410 and 420 and the third inclined portions 413 and 423 of the first and the second spoke 410 and 420 form a fourth type hole 434. The holes formed by the inclined portions 411 to 414 of the first spoke 410 and the inclined portions 421 to 424 of the second spoke 420 may have a polygonal shape. The semicircular portion 415 of the first spoke 410, the semicircular portion 425 of the second spoke 420, the fourth inclined portion 414 of the first spoke 410, and the fourth inclined portion 424 of the second spoke 420 form a fifth type hole 435. The semicircular portion 415 of the first spoke 410 and the semicircular portion 425 of the second spoke 420 form a circular hole 436.

The second type hole 432 is provided between the first type hole 431 and the third type hole 433. The fourth type hole 434 is surrounded by the third type hole 433, the fifth type hole 435 and the circular hole 436. The circular hole 436 is provided between the fifth type holes 435. The circular hole 436 and the fifth type hole 435 may be alternately provided at the outer band 12 side. The second type hole 432 may be greater than the third type hole 433. The third type hole 433 may be greater than the fourth type hole 434.

Figure 10:
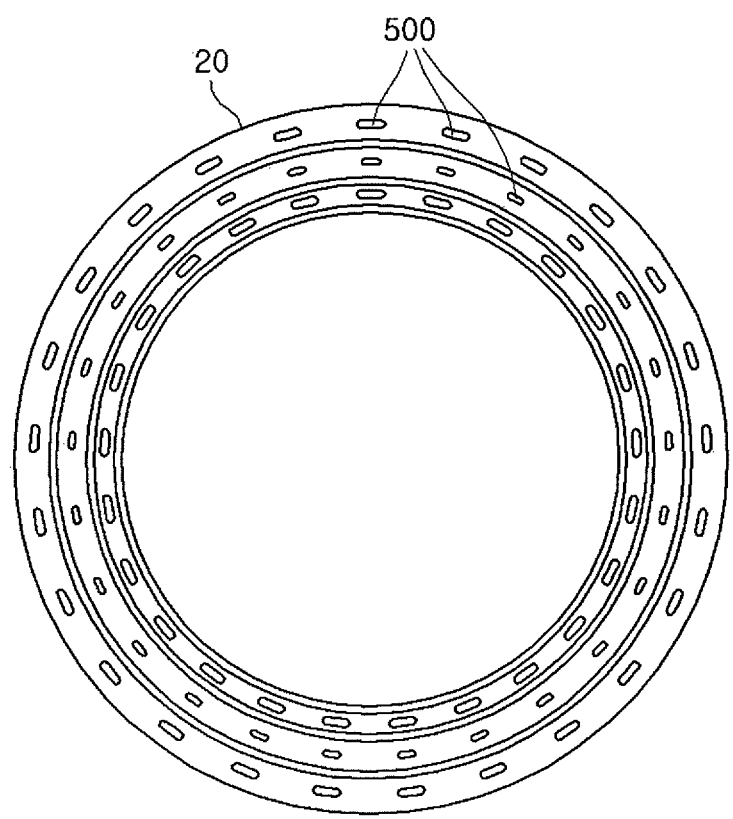
FIG. 10 is a side view of a non-pneumatic tire according to a fifth embodiment which is seen from the axial direction.
Figure 11:
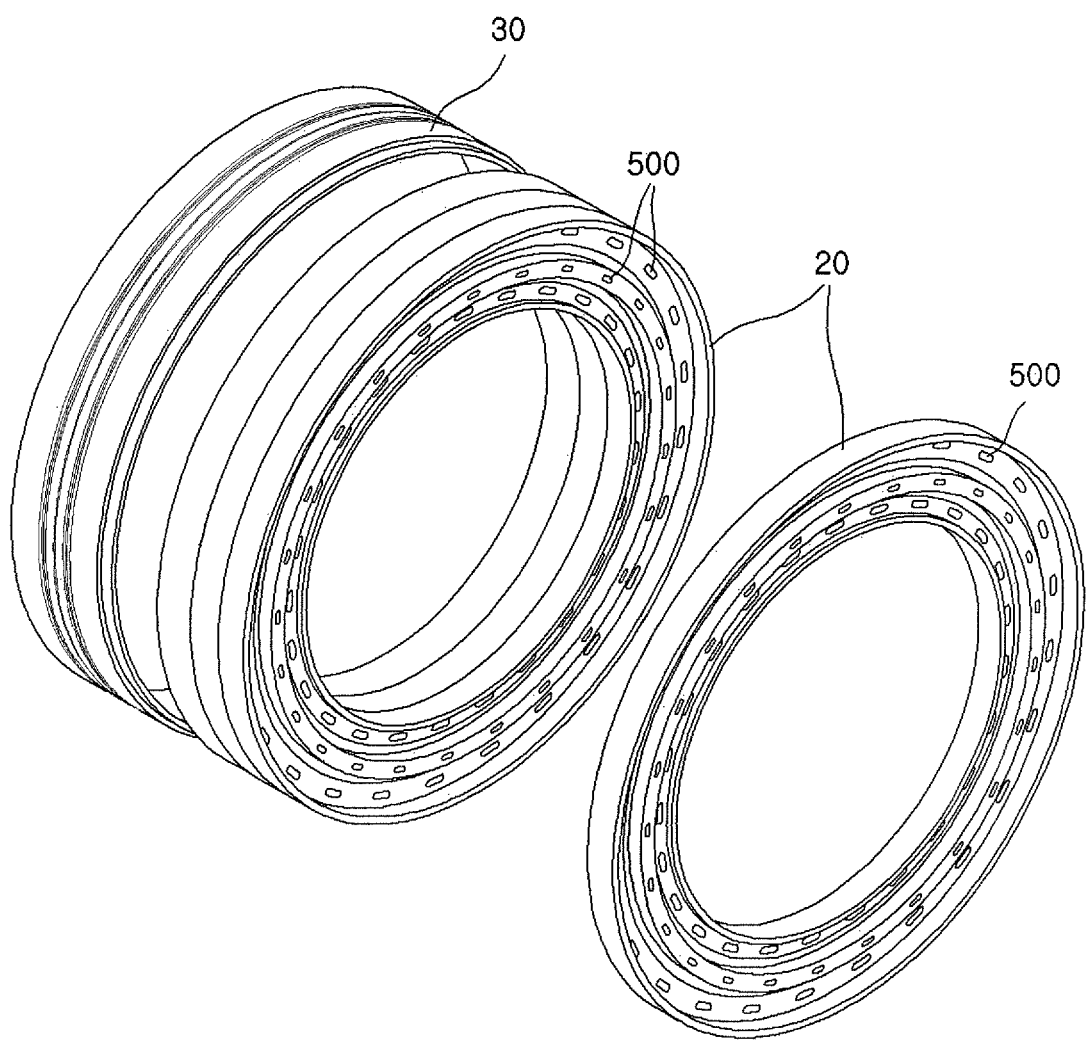
FIG. 11 is an exploded perspective view of the non-pneumatic tire according to the fifth embodiment.
Figure 12:
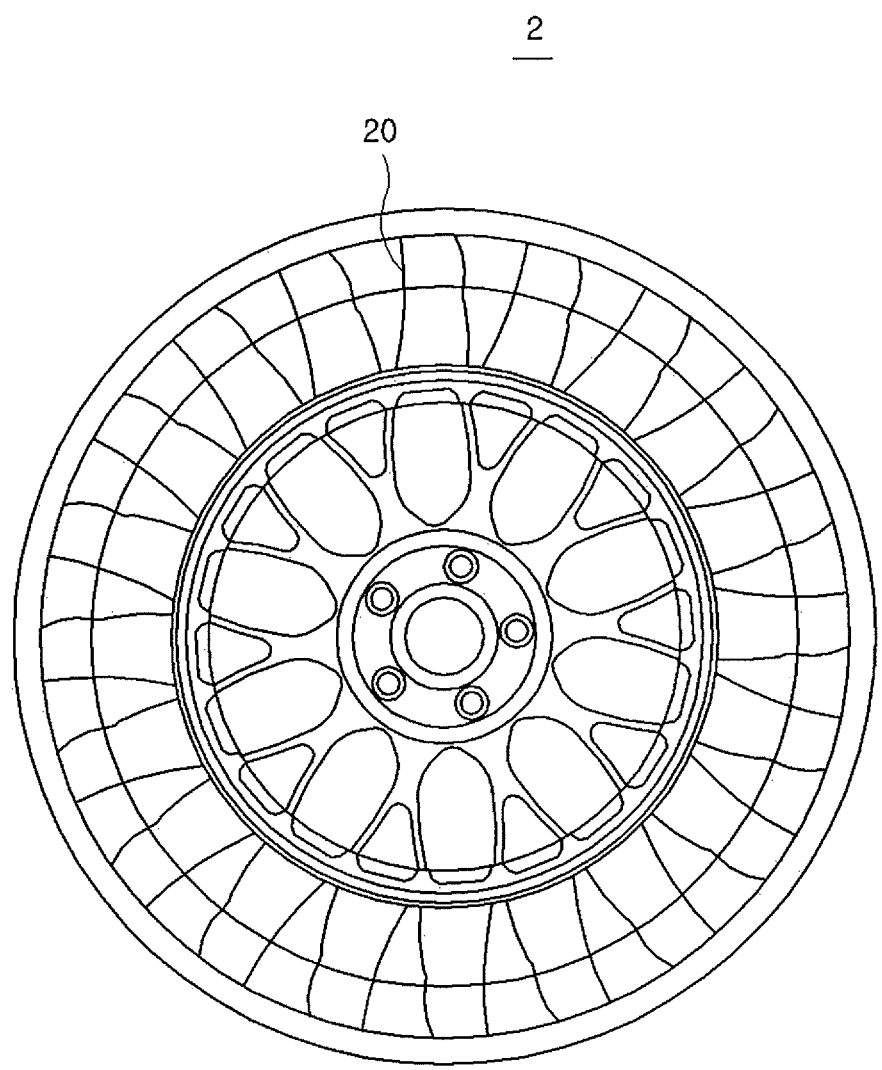
FIG. 12 is a side view of a conventional pneumatic tire.

In a fifth embodiment, the spoke part 20 may further have through holes penetrating in the axial direction. FIG. 10 shows a non-pneumatic tire according to the fifth embodiment which is viewed from the axial direction. FIG. 11 is an exploded perspective view of the non-pneumatic tire shown in FIG. 10.

Referring to FIGS. 10 and 11, one or more of the first spokes 110 to 410 and the second spokes 120 to 420 may have a plurality of through holes 500 penetrating in the axial direction. The through holes 500 may be side by side arranged along the radial direction when seen from the axial direction. The size and the number of the through holes 500 may be increased as the size of the tire is increased. The through holes 500 may be spaced apart from each other at a regular interval on the side surface of the spoke 20.

The spoke 20 is repetitively deformed by impact from the ground or the like and heated by the repetitively deformation. The through holes 500 of the spoke 20 enable heat generated by repetitive deformation of the spoke 20 to be discharged to the outside. Further, due to the presence of the through holes 500, the weight of the tire 1 can be decreased.

In the above-described embodiments, the inner band 11, the outer band 12, the first spokes 110 to 410, and the second spokes 120 to 420 are provided as separate members. However, it is not limited thereto. In other words, one or more of the inner band 11, the outer band 12, the first spokes 110 to 410, and the second spokes 120 to 420 may be formed as one unit. For example, the inner band 11, the outer band 12, the first spokes 110 to 410, and the second spokes 120 to 420 may form a single continuous member. The single continuous member may be manufactured by using a 3D printer. In addition, for example, a part of the inner band 11, a part of the outer band 12, and the first spokes 110 to 410 may form a single continuous member, and another part of the inner band 11, another part of the outer band 12, and the second spokes 120 to 420 may form another single continuous member. In that case, the single members may be formed by injection molding and then connected to each other (separate injection molding). The injection molding of the single members may be performed along the axial direction.

While the disclosure has been shown and described with respect to the embodiments, it will be understood by those skilled in the art that various changes and modifications may be made without departing from the scope of the disclosure as defined in the following claims.

Although exemplary embodiments of the present disclosure are described above with reference to the accompanying drawings, those skilled in the art will understand that the present disclosure may be implemented in various ways without changing the necessary features or the spirit of the present disclosure.

Therefore, it should be understood that the exemplary embodiments described above are not limiting, but only an example in all respects. The scope of the present disclosure is expressed by claims below, not the detailed description, and it should be construed that all changes and modifications achieved from the meanings and scope of claims and equivalent concepts are included in the scope of the present disclosure.

From the foregoing, it will be appreciated that various embodiments of the present disclosure have been described herein for purposes of illustration, and that various modifications may be made without departing from the scope and spirit of the present disclosure. The exemplary embodiments disclosed in the specification of the present disclosure do not limit the present disclosure. The scope of the present disclosure will be interpreted by the claims below, and it will be construed that all techniques within the scope equivalent thereto belong to the scope of the present disclosure.

What is claimed is:

1. A non-pneumatic tire comprising:
a band part, including an inner band and an outer band that is separated from the inner band and surrounds an outer peripheral surface of the inner band; and
a spoke part, extending in a circumferential direction of the non-pneumatic tire between the inner band and the outer band, and having a cross section having one or more holes extending continuously in the circumferential direction,
wherein the spoke part includes:
a first spoke, extending in a zigzag shape along the radial direction, forming a corner; and
a second spoke, extending in a zigzag shape along the radial direction to correspond to the first spoke, forming a corner,
wherein the first spoke has a first extended portion extending from the corner of the first spoke along the axial direction,
wherein the second spoke has a second extended portion extending from the corner of the second spoke along the axial direction and connected to the first extended portion, and
wherein the holes in the cross sectional shape are formed by the first spoke, the second spoke and the first and second extended portion.

2. The non-pneumatic tire of claim 1, wherein the first spoke and the second spoke are symmetrical with respect to an axis extending along the axial direction,
wherein the first spoke has a first tilted portion inclined toward one side of the axial direction and a second tilted portion inclined to the other side of the axial direction,
wherein the first tilted portion and the second tilted portion are arranged alternately along the radial direction,
wherein the corner directed to the axial direction is formed at a portion where the first tilted portion and the second tilted portion are connected,
wherein the first spoke is provided at one end portion of the axial direction,
wherein the first extended portion extends from the corner of the first spoke toward one side of the axial direction,
wherein the second spoke is provided at the other end portion of the axial direction, and
wherein the second extended portion extends from the corner of the second spoke toward the other side of the axial direction.

3. The non-pneumatic tire of claim 2, wherein the holes include hexagonal holes and semi-hexagonal holes,
wherein the hexagonal holes and the semi-hexagonal holes are alternately arranged along the axial direction at the inner band side,
wherein the hexagonal holes and the semi-hexagonal holes are alternately arranged along the axial direction at the outer band side, and
wherein the arrangement of the holes at the inner band side and the arrangement of the holes at the outer band side are symmetrical with respect to an axis extending in an axial direction.

* * * * *